United States Patent

Vick

[15] 3,641,379
[45] Feb. 8, 1972

[54] BRUSH LEAD RETAINER
[72] Inventor: Stephen L. Vick, Towson, Md.
[73] Assignee: The Black and Decker Manufacturing Company, Towson, Md.
[22] Filed: Sept. 15, 1970
[21] Appl. No.: 72,373

[52] U.S. Cl. ............................ 310/239, 310/50, 310/249
[51] Int. Cl. ................................................... H02k 5/14
[58] Field of Search .............. 310/50, 71, 248, 249, 242, 310/239; 339/101, 103

[56] References Cited

UNITED STATES PATENTS

| | | | |
|---|---|---|---|
| 3,441,766 | 4/1969 | Amrein et al. | 310/239 |
| 3,034,006 | 5/1962 | Short | 310/239 X |
| 3,510,708 | 5/1970 | O'Connor | 310/242 |
| 2,683,826 | 7/1954 | Staak | 310/239 X |
| 3,329,844 | 7/1967 | Happe | 310/239 |
| 3,436,576 | 4/1969 | Klebe | 310/239 |
| 3,474,274 | 10/1969 | Groschopp et al. | 310/242 |

*Primary Examiner*—Thomas J. Kozma
*Assistant Examiner*—Ulysses Weldon
*Attorney*—Leonard Bloom, Joseph R. Slotnik and Edward D. Murphy

[57] ABSTRACT

A heavy-duty portable electric tool such as a hammer which includes a universal motor and improved brush lead retaining means. A brush is held adjacent a commutator by means of a conductive brush holder and a conductive lead is attached to the brush holder by means of a fastener. An insulating ring is positioned to prevent the fastener from loosening. The ring also includes a channel-shaped extension which retains the lead and prevents it from moving outwardly toward the housing of the tool if the lead should break loose from the fastener.

9 Claims, 4 Drawing Figures

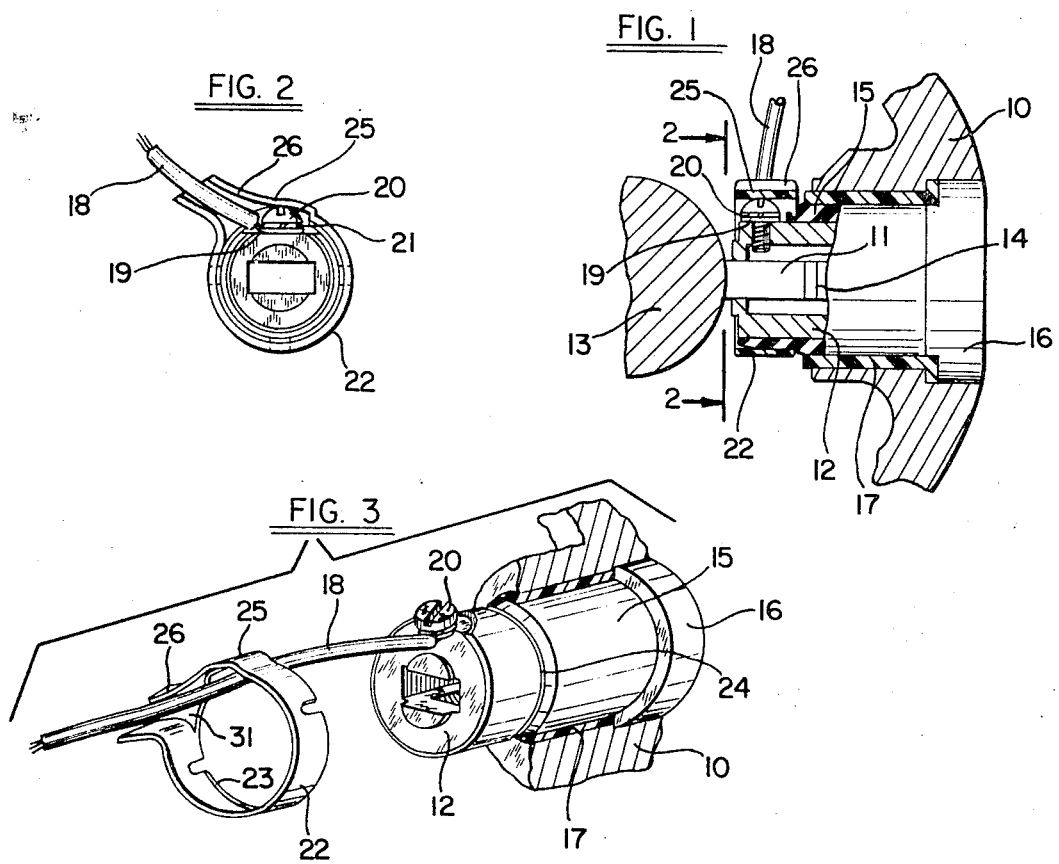
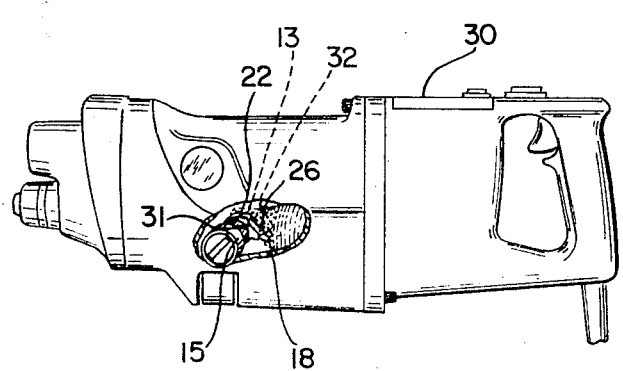
INVENTOR.
STEPHEN L. VICK
BY
Edward D. Murphy 3,641,379

BRUSH LEAD RETAINER

The present invention is directed to an improved brush lead retaining assembly for power tools intended for heavy-duty use.

Power tools which, during their normal usage, are subjected to shock and continuous vibration require extra precautions in order to avoid frequent servicing of the tool and to protect the operator from the danger of electrical shock if a failure occurs. It is the purpose of this invention to provide a simple, easily assembled device for providing such protection in the region of the brush holders of an electric motor without unduly increasing the cost of the unit.

Accordingly, it is an object of this invention to provide improved brush rigging for a universal electric motor.

It is a further object of this invention to provide an improved retainer for the brush lead and connector in a universal electric motor.

Another object of this invention is the provision of an improved, low cost protective assembly for the brush lead connection in a universal electric motor.

Further objects and advantages of this invention will become apparent as the description and illustration thereof proceed.

Briefly, in accord with one embodiment of this invention, brush rigging for a universal electric motor is provided which includes a metallic brush holder retainer in an insulated sleeve which is seated in the metallic casing of a power tool. A brush is mounted within the brush holder for making contact to a commutator in the usual manner. The brush is connected to the remainder of the motor circuit by means of a wire lead ending in a terminal which is connected to the brush holder by a fastener such as a screw. In accord with the present invention, a retainer ring of insulating material is provided which is mounted over the end of the insulating sleeve. The retainer ring includes a wall portion which is positioned immediately above the head of the screw to prevent the screw from loosening and backing out during vibration. The retainer ring also includes a channel portion which serves as a guideway for the wire lead. The channel portion includes a wall disposed between the lead and the metal casing of the tool so as to prevent the wire from moving outwardly into contact with the casing if it should break loose from the fastener.

In the drawing:

FIG. 1 is a cross-sectional view through the brush holder and associated parts in a tool constructed in accord with the present invention;

FIG. 2 is a view taken along the lines 2—2 of FIG. 1;

FIG. 3 is a perspective view showing the assembly of the parts of this invention; and FIG. 4 is an elevational view, partially cut away, of a tool constructed in accord with the present invention.

In FIG. 1, a motor enclosure such as the casing 10 of a power tool is partially illustrated. Within the casing, a brush 11 is retained within a brush holder 12. The brush is biased against a commutator 13 by a spring 14. The brush holder 12 is enclosed by an insulating sleeve 15 which may be, for example, a phenolic laminate and which has an enlarged portion 16 at the radially outer end for receiving a brush cap, not shown. For double insulation purposes, a second insulating sleeve 17 of 10 percent glass-filled polycarbonate may also be provided. The sleeves are seated within a cavity in the casing 10.

Electrical connection to the brush is made by means of an electrical lead 18, shown more clearly in FIG. 2. The wire ends in a terminal 19 which is fastened to the brush holder by means of a screw 20 and lock washer 21. In accord with the present invention, an insulating retainer ring 22 of 10 percent glass filled polycarbonate is provided around the end of the insulating sleeve 15. The ring may be retained on the sleeve by means such as a small flange 23 which snaps into a groove 24 in the sleeve. The ring 22 includes a wall portion 25 which is spaced slightly from the sleeve 15 so as to accommodate the head of screw 20. The retaining ring also includes a channel portion 26 which receives the wire 18. Assembly of this construction is illustrated in FIG. 3. As shown, the wire is first passed through the retaining ring 22 and then the terminal mounted by means of the screw 20 to the side of the brush holder. After the screw has been threaded into place, the retaining ring is snapped over the bottom of the sleeve 14 in a position such that the wall portion 25 accommodates and prevents movement of the screw 20 while the channel portion 26 receives the wire 18.

As shown in FIG. 4, this construction is intended for use in power tools subjected to heavy duty usage, particularly involving severe vibration such as an electric hammer 30. During such vibration the screw 20 may loosen and, in other constructions, back out of its threaded mounting, releasing the wire. This is prevented in the construction according to the present invention by means of the wall portion 25. Also under the severe vibration, the connection between the wire 18 and the terminal 19 may sometimes be subjected to breaking. As can be seen in FIGS. 2 and 4, the wall portion 31 of channel 26 prevents this lead from moving outwardly towards the metal casing if such breakage should occur. Accordingly, if the wire moves at all, it can only move inwardly toward the armature 32 but this produces no danger of shock to the operator.

In general, the present invention is directed to the concept of retaining the brush lead and faster therefor in fixed connection with the brush holder of an electric tool and for preventing a possible hazard in the event of lead breakage. It will be clear to those skilled in the art that many changes and modifications can be made from the illustrated embodiment without departing from this concept. Accordingly, it is intended that the appended claims cover all such changes and modifications as may fall within the true spirit and scope of this invention.

I claim:

1. Brush rigging for a universal motor comprising
   brush means for making electrical contact to a commutator;
   a conductive brush holder for retaining said brush adjacent a commutator; said brush holder being seated in a housing;
   a conductive lead extending to said brush holder;
   fastening means for conductively attaching an end of said lead to said brush holder at an end thereof adjacent said commutator; and
   shield means for retaining said fastening means in place, said shield means comprising an annular ring around said end of said brush holder;
   said shield means including an extension for retaining said lead against movement toward said housing in the event of lead breakage adjacent said fastening means.

2. The combination claimed in claim 1 wherein said brush holder is retained in an insulating sleeve, and said sleeve is seated in a metallic housing.

3. The combination claimed in claim 2 wherein said fastening means comprises a screw threaded into said brush holder.

4. The combination claimed in claim 3 wherein said shield comprises an insulating ring mounted on said sleeve and having a portion spaced from said sleeve to accommodate said screw.

5. The combination claimed in claim 4 wherein said shield includes a channel portion for receiving said lead, said channel portion providing a barrier between said lead and said housing.

6. The combination claimed in claim 4 wherein said sleeve includes a groove in the external surface thereof and said ring includes annular detent means received in said groove to retain said ring on said sleeve.

7. In a portable electric tool adapted for heavy-duty vibrational use, said tool including a housing, and a universal electric motor within said housing, said motor having an armature, a commutator, and at least one brush for making electrical connection to said commutator, the improvement comprising
   a brush holder assembly extending through said housing for retaining said brush adjacent said commutator;
   a cylindrical conductive member located within said assembly for guiding said brush;
   an insulating sleeve surrounding said member and seated in said housing;

a conductive lead extending to said member within said housing;

fastening means for attaching said lead to said member at an end adjacent said commutator; and an annular insulating ring encircling the inner end of said member and mounted on said sleeve, said ring including a wall portion disposed adjacent said fastening means for preventing movement thereof.

8. The combination claimed in claim 7 wherein said ring includes means for preventing movement of said lead toward said housing in the event of lead breakage adjacent said fastening means.

9. The combination claimed in claim 8 wherein said (shield means includes) means for preventing movement comprises a channel portion for receiving said lead, said channel portion providing a barrier between said lead and said housing.

* * * * *